(12) United States Patent
Barreira Avegliano et al.

(10) Patent No.: US 9,959,872 B2
(45) Date of Patent: May 1, 2018

(54) MULTIMODAL SPEECH RECOGNITION FOR REAL-TIME VIDEO AUDIO-BASED DISPLAY INDICIA APPLICATION

(71) Applicant: International Business Machines Corporation, Armonk, NY (US)

(72) Inventors: Priscilla Barreira Avegliano, Sao Paulo (BR); Carlos Henrique Cardonha, Sao Paulo (BR); Stefany Mazon, Sao Paulo (BR); Julio Nogima, Londrina (BR)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 92 days.

(21) Appl. No.: 14/967,726

(22) Filed: Dec. 14, 2015

(65) Prior Publication Data
US 2017/0169827 A1    Jun. 15, 2017

(51) Int. Cl.
| | |
|---|---|
| *G10L 15/00* | (2013.01) |
| *G10L 15/26* | (2006.01) |
| *G10L 15/32* | (2013.01) |
| *G10L 21/10* | (2013.01) |
| *G10L 21/18* | (2013.01) |
| *H04N 21/488* | (2011.01) |
| *H04N 21/44* | (2011.01) |

(Continued)

(52) U.S. Cl.
CPC .............. *G10L 15/32* (2013.01); *G10L 15/26* (2013.01); *G10L 21/10* (2013.01); *G10L 21/18* (2013.01); *H04N 21/4394* (2013.01); *H04N 21/44008* (2013.01); *H04N 21/4884* (2013.01); *H04N 21/84* (2013.01); *H04N 21/8456* (2013.01); *G10L 2021/065* (2013.01)

(58) Field of Classification Search
CPC ..... G10L 15/26; G10L 15/32; H04N 21/4408; H04N 21/4394; H04N 21/4884
USPC .................................. 704/231, 235, 246, 251
See application file for complete search history.

(56) References Cited

U.S. PATENT DOCUMENTS

| 5,815,196 A | 9/1998 | Alshawi |
|---|---|---|
| 7,191,117 B2 | 3/2007 | Kirby et al. |

(Continued)

FOREIGN PATENT DOCUMENTS

| EP | 2106121 A1 | 9/2009 |
|---|---|---|
| WO | 0195631 A2 | 12/2001 |

(Continued)

*Primary Examiner* — Olujimi Adesanya
(74) *Attorney, Agent, or Firm* — Cantor Colburn LLP

(57) ABSTRACT

Aspects relate to computer implemented methods, systems, and processes to automatically generate audio-based display indicia of media content including receiving, by a processor, a plurality of media content categories including at least one feature, receiving a plurality of categorized speech recognition algorithms, each speech recognition algorithm being associated with a respective one or more of the plurality of media content categories, determining a media content category of a current media content based on at least one feature of the current media content, selecting one speech recognition algorithm from the plurality of categorized speech recognition algorithms based on the determination of the media content category of the current media content, and applying the selected speech recognition algorithm to the current media content.

20 Claims, 3 Drawing Sheets

(51) Int. Cl.
*H04N 21/439* (2011.01)
*H04N 21/84* (2011.01)
*H04N 21/845* (2011.01)
*G10L 21/06* (2013.01)

(56) References Cited

U.S. PATENT DOCUMENTS

| | | | |
|---|---|---|---|
| 7,302,451 B2 * | 11/2007 | Radhakrishnan | G06F 17/30787 |
| 7,382,770 B2 | 6/2008 | Bergman et al. | |
| 7,406,413 B2 | 7/2008 | Geppert et al. | |
| 7,409,407 B2 * | 8/2008 | Radhakrishnan | G06F 17/30787 |
| 7,480,615 B2 | 1/2009 | Attias et al. | |
| 7,739,116 B2 | 6/2010 | Miyamoto et al. | |
| 8,095,364 B2 | 1/2012 | Longe et al. | |
| 8,126,897 B2 | 2/2012 | Sznajder et al. | |
| 8,195,468 B2 | 6/2012 | Weider et al. | |
| 8,355,915 B2 | 1/2013 | Rao | |
| 8,442,820 B2 | 5/2013 | Kim et al. | |
| 8,452,778 B1 * | 5/2013 | Song | G06K 9/00711 |
| | | | 704/233 |
| 9,411,830 B2 * | 8/2016 | Mei | G06F 3/0488 |
| 2003/0004966 A1 * | 1/2003 | Bolle | G06F 17/30253 |
| 2003/0023437 A1 | 1/2003 | Fung | |
| 2003/0033347 A1 * | 2/2003 | Bolle | G06F 17/30253 |
| | | | 718/107 |
| 2003/0105630 A1 * | 6/2003 | MacGinitie | G10L 15/01 |
| | | | 704/235 |
| 2003/0131362 A1 | 7/2003 | Jasinschi et al. | |
| 2004/0042591 A1 | 3/2004 | Geppert et al. | |
| 2007/0050406 A1 | 3/2007 | Byers | |
| 2009/0248414 A1 * | 10/2009 | Shimomori | G10L 17/00 |
| | | | 704/246 |
| 2009/0327263 A1 | 12/2009 | Maghoul | |
| 2010/0125450 A1 * | 5/2010 | Michaelangelo | G06F 17/2725 |
| | | | 704/9 |
| 2011/0093263 A1 * | 4/2011 | Mowzoon | G10L 15/26 |
| | | | 704/235 |
| 2011/0320197 A1 * | 12/2011 | Conejero | G06F 17/3002 |
| | | | 704/235 |
| 2012/0316882 A1 * | 12/2012 | Fiumi | G10L 15/30 |
| | | | 704/270 |
| 2013/0067333 A1 * | 3/2013 | Brenneman | G06F 17/30796 |
| | | | 715/721 |
| 2013/0216202 A1 | 8/2013 | Palakshamurthy et al. | |
| 2013/0282747 A1 * | 10/2013 | Cheng | G06F 17/30023 |
| | | | 707/758 |
| 2014/0088961 A1 * | 3/2014 | Woodward | G10L 15/22 |
| | | | 704/235 |
| 2014/0188925 A1 * | 7/2014 | Skolicki | H04N 21/4622 |
| | | | 707/765 |
| 2015/0088508 A1 * | 3/2015 | Bharadwaj | G10L 15/063 |
| | | | 704/237 |
| 2015/0116198 A1 * | 4/2015 | McCoy | G06F 3/14 |
| | | | 345/156 |
| 2015/0312649 A1 * | 10/2015 | Gopalan | H04N 21/84 |
| | | | 725/32 |

FOREIGN PATENT DOCUMENTS

| | | |
|---|---|---|
| WO | 2004080072 A1 | 9/2004 |
| WO | 2004093078 A1 | 10/2004 |
| WO | 2011014927 A1 | 2/2011 |
| WO | 2014155377 A1 | 10/2014 |

* cited by examiner

US 9,959,872 B2

MULTIMODAL SPEECH RECOGNITION FOR REAL-TIME VIDEO AUDIO-BASED DISPLAY INDICIA APPLICATION

BACKGROUND

The present disclosure relates generally to audio-based display indicia in media playback and, more specifically, to methods, systems, and processes for multimodal speech recognition processes for real-time audio-based display indicia application for media content.

A video or other media may include audio-based display indicia, such as subtitles or closed captions. The subtitles or closed captions can provide a translation or a transcript of the spoken dialogue and/or sounds in the content of the media that is played back, such as a video, and, optionally, the audio-based display indicia may contain other information to provide context and/or indicia to a viewer regarding the content of the media. Closed captions may be useful to hearing impaired viewers. Subtitles may be useful for viewing foreign language videos or for viewing videos in a noisy environment.

Live captioning may be performed manually, with a person or operator listening and recognizing the spoken words in content and typing in real-time. Other solutions may involve general-purpose automated transcription of speech in real-time. Variations in media types, content, etc. may provide challenges for automated solutions from being viable or effective.

SUMMARY

Embodiments provided herein relate to computer implemented methods, systems, and processes to automatically generate audio-based display indicia of media content including receiving, by a processor, a plurality of media content categories including at least one feature, receiving a plurality of categorized speech recognition algorithms, each speech recognition algorithm being associated with a respective one or more of the plurality of media content categories, determining a media content category of a current media content based on at least one feature of the current media content, selecting one speech recognition algorithm from the plurality of categorized speech recognition algorithms based on the determination of the media content category of the current media content, and applying the selected speech recognition algorithm to the current media content.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

One of the biggest challenges for technologies performing automated transcription of speech in real-time is the considerably broad scope the automated systems have to cover, which may impact the transcription accuracy according to the features of the scene (e.g., one system may work well for a slow scene and not so well for a fast scene). That is, providing audio-based display indicia with media content in a live or active manner may be difficult. For example, variances with the features of the content might be observed within a single media content, such as a movie. For example, some scenes may be slower with a lot of light and silence, whereas others may be fast and loud. Such variances may make the task of a general-purpose automated captioning engine or algorithm difficult and potentially inaccurate.

As noted above, live captioning may be performed manually (i.e., the words are recognized and typed in real-time by a human operator). Alternatively, speech recognition engines algorithms may be used for live captioning, but these engines or algorithms may not use metadata of the media content (as well as many other features the media content may include) to facilitate the recognition and the captioning processes. As provided herein, systems and methods that employ different types of information yielded by and/or contained in the media content (e.g., metadata, image histogram, features of sound including volume and/or pitch) in order to classify scenes in categories. Further, embodiments provided herein may define categories of algorithms, which may be trained with and applied to scenes of media content belonging to that same category.

Figure 1:
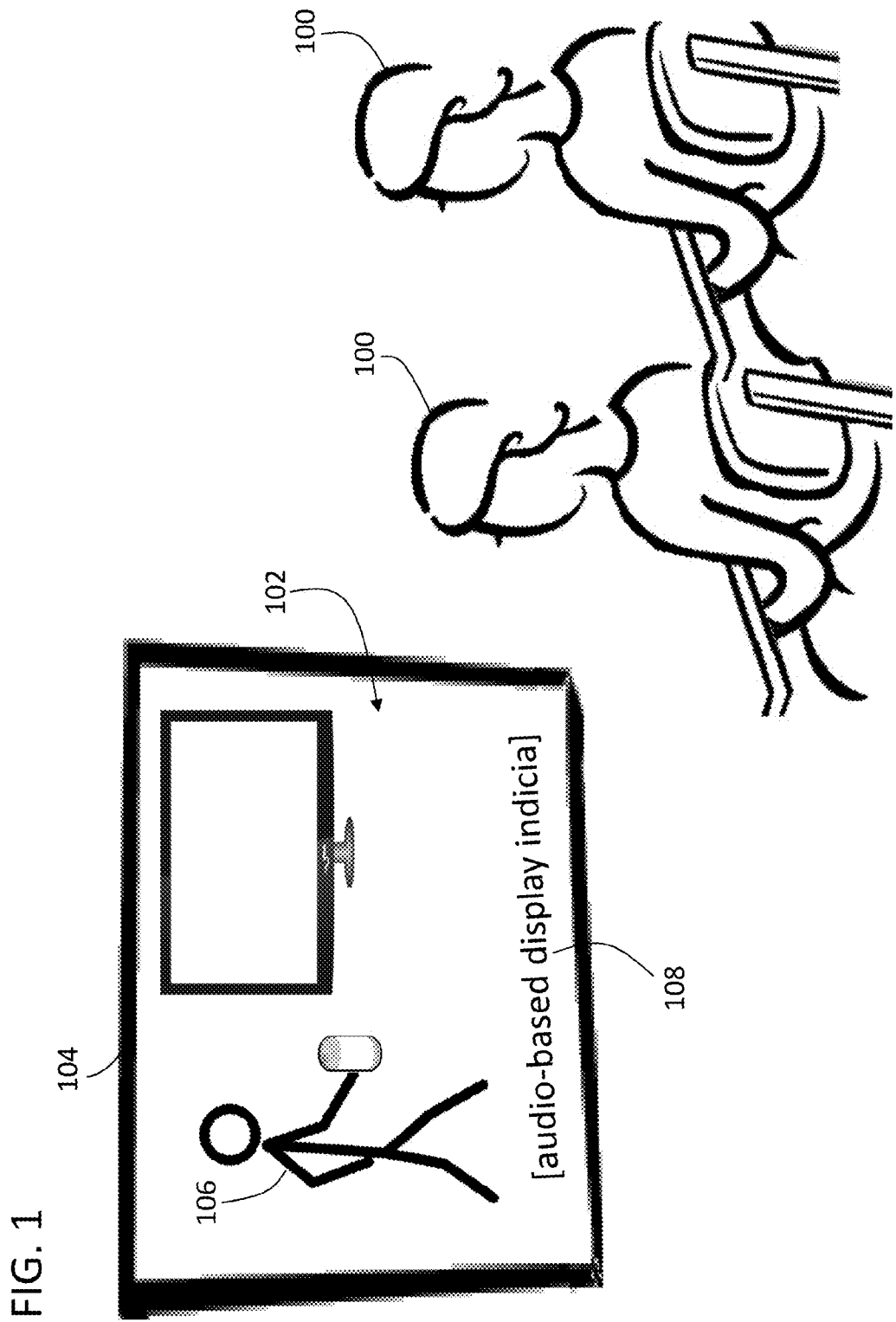
FIG. 1 depicts a schematic illustration of viewers viewing a playback of media content having audio-based display indicia using a system in accordance with a non-limiting embodiment of the present disclosure.

As shown in FIG. 1, an example of viewers observing playback of media content, such as a video, in accordance with a non-limiting embodiment of the present disclosure is shown. FIG. 1 depicts an example of viewers 100 viewing media content 102 during playback displayed on a screen 104, the screen 104 being part of, for example, a television, a computer, a movie theater screen, etc. In a scene depicted on the screen 104, an actor or character 106 is shown, and the character 106 may have dialogue that is part of an audio track of the media content. The viewers 100 may wish to have audio-based display indicia 108 displayed on the screen 104 to enable understanding of the narrative of the media content. As used herein, the term "audio-based display indicia" includes subtitles, closed captioning, and/or other text or images that may be displayed on a screen during a media playback that represents dialogue or other audible sounds that may be shown or described to a viewer to aid in understanding speech, dialogue, or other aspects of a narrative of media content during playback.

Subtitling may be used as a way of translating a medium into another language so that speakers of other languages can enjoy spoken material. Subtitles may be derived from either a transcript or screenplay of the dialog or commentary in films, television programs, video games, and the like. Additional information may be configured within the subtitles to help viewers who are deaf and/or hard of hearing to follow the dialog, people who cannot understand the spoken dialogue, and/or people who have accent recognition problems. For example, foreign films are an example that may employ subtitles. Without subtitles, English-speaking audiences may be unable to easily follow the plot of a French or Spanish movie. Subtitles may be displayed as the audio of media content is played back, e.g., simultaneously or nearly simultaneously.

Captioning or closed captioning may be used as a service to aid deaf and hearing-impaired audiences or for other reasons, such as when a viewer mutes playback of media content. Captions are adaptable to live broadcasts, such as news broadcasts, sports events, and television shows broadcast live. In some instances, captions may be broadcast or provided with a delay from the actual audio dialogue being spoken in the media content. In some configurations, the captions are manually generated by a human operator, and in other configurations, the captions may be automatically generated using a speech recognition engine or algorithm.

Figure 2:
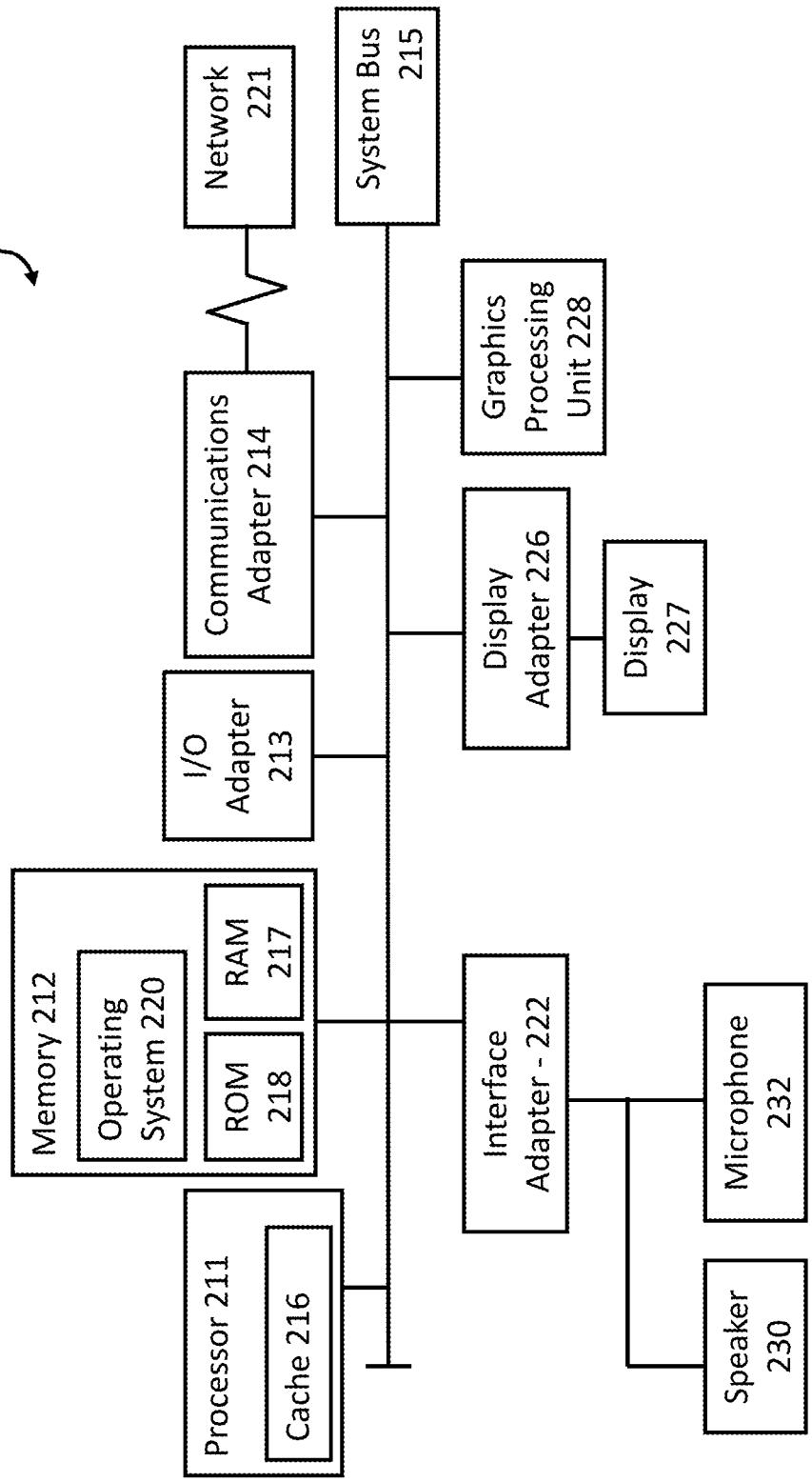
FIG. 2 illustrates a block diagram of a computer system for use in practicing the teachings herein.

Turning now to FIG. 2, a block diagram of a computing system 210 (hereafter "system 210") for use in practicing embodiments described herein is shown. The methods and processes described herein can be implemented in hardware, software (e.g., firmware), or combinations thereof. In an example embodiment, the methods described herein may be implemented in hardware, and may be part of a microprocessor of a special or general-purpose digital computing system, such as a personal computer, television, projector, minicomputer, or other computing device, especially one configured for displaying playback of media content, such as videos and/or movies. The system 210 therefore can embody a general-purpose computing system and may be a computing part or subpart of an electronic device, such as a media playback device. In another embodiment, the methods described herein may be implemented as part of a mobile device, such as, for example, a mobile phone, a personal data assistant (PDA), a tablet computer, laptop computer, etc.

In the non-limiting embodiment of FIG. 2, in terms of hardware architecture, the system 210 includes a processor 211. The system 210 also includes memory 212 coupled to the processor 211, and one or more input and/or output (I/O) adapters 213, that may be communicatively coupled via a local system bus 215. The memory 212 and/or other components of the system 210 may be operatively coupled to one or more internal or external memory devices accessed through a network 221. A communications adapter 214 may operatively connect the system 210 to the network 221. The system bus 215 may also connect one or more user interfaces via interface adapter 222. Interface adapter 222 may connect a plurality of user interfaces to the system 210 including, for example, touch screens (e.g., part of a display 227), keyboard, mouse, speaker, remote control, etc., that may be part of the system 210. In one non-limiting example, the interface adapter 222 may enable a user of the system 210 to input data through a touch screen, a keyboard, a remote control, or other user input device.

The system bus 215 may also connect a display adapter 226 and a display 227 to the processor 211. The processor 211 may also be operatively connected to a graphical processing unit 228 used for displaying images and/or information on the display 227, such as media content during playback. Further, the processor 211 and other components may be configured to determine an appropriate audio-based display indicia engine or algorithm, provide speech recognition, and overlay and display the audio-based display indicia onto an image on the display 227. In some embodiments, the display 227 may be a screen in a movie theater, television, monitor, etc. and some or all of the other components of system 210 may be configured separate therefrom (e.g., in a set-top box, gaming console or system, personal computer, components and/or computers of a broadcasting station, etc.).

The processor 211 may be a hardware device for executing hardware instructions or software that may be stored in a non-transitory computer-readable memory (e.g., memory 212) or provided from an external source through the network 221. The processor 211 can be any custom made or commercially available processor, a central processing unit (CPU), a plurality of CPUs, an auxiliary processor among several other processors associated with the system 210, a semiconductor based microprocessor (in the form of a microchip or chip set), a macroprocessor, or generally any device for processing data and/or executing instructions. The processor 211 can include a memory cache 216.

The memory 212 can include random access memory (RAM) 217 and read only memory (ROM) 218. The RAM 217 can be any one or combination of volatile memory elements (e.g., DRAM, SRAM, SDRAM, etc.). The ROM 218 can include any one or more non-volatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, the memory 212 may incorporate electronic, magnetic, optical, and/or other types of non-transitory computer-readable storage media. As will be appreciated by those of skill in the art, the memory 212 can have a distributed architecture, where various components are situated remote from one another, but can be accessed by the processor 211.

The instructions in the memory 212 may include one or more separate programs, each of which comprises an ordered listing of computer-executable instructions for implementing logical functions. In the example of FIG. 2, the instructions in the memory 212 may include a suitable operating system 220. The operating system 220 can control the execution of other computer programs and provide scheduling, input-output control, file and data management, memory management, and communication control, and related services. For example, the operating system 220 may be an operating system for a personal computer, television, etc. that includes the processor 211 and other associated components as shown and described in system 210.

The I/O adapter 213 can be, for example but not limited to, one or more buses or other wired or wireless connections, as is known in the art. The I/O adapter 213 may have additional elements, which are omitted for simplicity, such as controllers, buffers (caches), drivers, repeaters, and receivers, to enable communications. The I/O adapter 213 may be configured to receive input from a DVD player (or the like) or other device that may supply media or content for media playback.

As noted above, the interface adapter 222 may be configured to operatively connect one or more I/O devices to the system 210. For example, in some configurations, the interface adapter 222 may connect a conventional keyboard and mouse or be configured to receive input from a remote control device associated with the system 210. Other output devices operatively connected to the interface adapter 222 may include a speaker 230 and a microphone 232. Further, other output devices may also be included, although not shown. The I/O devices connectable to the interface adapter 222 may further include devices that communicate both inputs and outputs, for instance but not limited to, a network interface card or modulator/demodulator (for accessing other files, devices, systems, or a network), a radio frequency or other transceiver, a telephonic interface, a bridge, a router, and the like. Further, the interface adapter 222 may enable communication with one or more electronic devices, such as over Bluetooth or other near-field communications protocol. As will be appreciated by those of skill in the art, sound detected at the microphone 232 may be converted to data that is sent to the processor 211 for processing in accordance with embodiments provided herein.

The network 221 can be an IP-based network for communication between system 210 and any external device(s), e.g. servers. The network 221 enables transmissions of data between the system 210 and external systems. In a non-limiting embodiment, the network 221 can be a managed IP network administered by a service provider. The network 221 may be implemented in a wireless fashion, e.g., using wireless protocols and technologies, such as WiFi, WiMax, etc. The network 221 can also be a packet-switched network such as a local area network, wide area network, metropolitan area network, Internet network, or other similar type of network environment. The network 221 may be a fixed wireless network, a wireless local area network (LAN), a wireless wide area network (WAN) a personal area network (PAN), a virtual private network (VPN), intranet or other suitable network system. The network 221 may enable the system 210 to provide streaming media playback from internet-based services.

In some embodiments, the instructions in the memory 212 may further include a basic input output system (BIOS) (omitted for simplicity). The BIOS is a set of essential routines that initialize and test hardware at startup, start the operating system 220, and support the transfer of data among the operatively connected hardware devices. The BIOS may be stored in the ROM 218 so that the BIOS can be executed when the system 210 is activated. When the system 210 is in operation, the processor 211 may be configured to execute instructions stored within the memory 212, to communicate data to and from the memory 212, and to generally control operations of the system 210 pursuant to the instructions.

During playback of a video or other media content, a viewer (e.g., viewer 100 in FIG. 1) may wish to have audio-based display indicia provided to enable easier understanding of speech or other audible content of a media content. For example, in media content, or portions thereof, various speakers may have varying or different accents and/or speech impediments, for which a recognition engine may have trouble generating and delivering accurate results.

As such, embodiments provided herein enable systems and methods that employ different types of information yielded by and/or obtained from media content (e.g., metadata, image histogram, sound characteristics, etc.) in order to classify a scene of the media content into a category and in order to define categories of algorithms or speech recognition engines (hereinafter "speech recognition algorithms") which are trained with and applied to the scenes belonging to the same category. For example, systems and methods that perform automated video subtitling by classifying movies (or scenes) according to features of the media content are provided. The systems and methods select and apply an appropriate speech recognition algorithm that is tailored for the particular category of media content that has been identified. Features of the media content refer not only to information that might be directly obtained from the video description (e.g., in the case of movies, metadata such as genre, country, year, etc.), but also includes information extracted from images of the media content (e.g., histogram, black-and-white vs. colored, cartoon vs. reality) and sonorous elements of the media content (e.g., speech volume, soundtrack, soundtrack volume, environment sound).

For example, a system may include a memory with a plurality of different speech recognition algorithms, and each algorithm may be tailored to function optimally with a specific genre, type of media content, media content situation, etc. Alternatively, or combination therewith, the system may be in communication with one or more sources that contain a plurality of classified speech recognition algorithms.

The system may further include a processor that is configured to analyze a media content to classify a type of media content and/or portion of media content. Upon classifying the current media content being played back, the system may select an appropriate speech recognition algorithm to apply to the audio of the media content. The system then may display audio-based display indicia on the image of the media content during playback.

Embodiments provided herein may employ a multi-modal definition of categories for media content. For example, categories of media content may be defined by non-supervised learning (clustering) based on the following non-limiting set of features: metadata (e.g., genre, country, year, black and white images, etc.); sound (e.g., Fourier Graphs, variance of frequencies, etc.); image (e.g., histograms); drawings (e.g., cartoon) and reality; recognizing characteristics of characters of the media content (e.g., age, gender, etc.); etc.

With the media content categories established, the system and processes provided herein include training the system to learn the characteristics for each category. That is, once the categories for the media content are established, a corresponding set of categories may be set for a plurality of speech recognition algorithms. In this process, each media content or portion thereof is defined with a category, and for each category, a training algorithm is applied to generate and/or calibrate parameters of a speech recognition algorithm that is best suited for the particular media content category. Thus, a database may be established that correlates media content categories with specific speech recognition algorithms. As such, each speech recognition algorithm may be associated with one or more characteristics contained in media content (e.g., the media content categories).

One non-limiting example of training, as used herein, is as follows. A training phase may be implemented that creates or generates categories of media content or parts of media content automatically. For example, the system may employ unsupervised learning techniques, such as clustering, to generate a list of media content categories. During this process a classification algorithm X may be generated. The classification algorithm X may be used to indicate the media content category of media content (e.g., a whole movie, a scene, segments of media content, a commercial, etc.). The classification algorithm X may generate c media content categories of media content types. For each media content category c the system may be configured to train and/or configure a speech recognition algorithm or engine $Y_c$. This may be determined based on the elements of the training that belong to the particular media content category. That is, each speech recognition algorithm or engine $Y_c$ may be calibrated, configured, and/or generated specifically based on only the elements belonging to the respective media content category such that the speech recognition algorithm or engine $Y_c$ is specific to a media content category. The classification of the elements of the training sets for calibration or generation of the speech recognition algorithm or engine $Y_c$ may be based on the classification algorithm X.

With the database established, a system or process may be performed to provide contextual real-time generation and/or display of audio-based display indicia. For example, in process, the system or process may include performing speech cognition and identifying a particular media content category, selecting an appropriate speech recognition algorithm based on the identified media content category, and apply the selected speech recognition algorithm to provide real-time generation and/or display of audio-based display indicia.

For example, in a non-limiting embodiment, a recognition and application phase may be performed. In this phase, given a new media content, classification algorithm X may be applied to the content to identify a media content category $c_i$ for the media content or segments thereof. Then, given the identified media content category $c_i$, an associated speech recognition algorithm or engine $Y_{ci}$ may be applied to generate subtitles for the media content.

Figure 3:
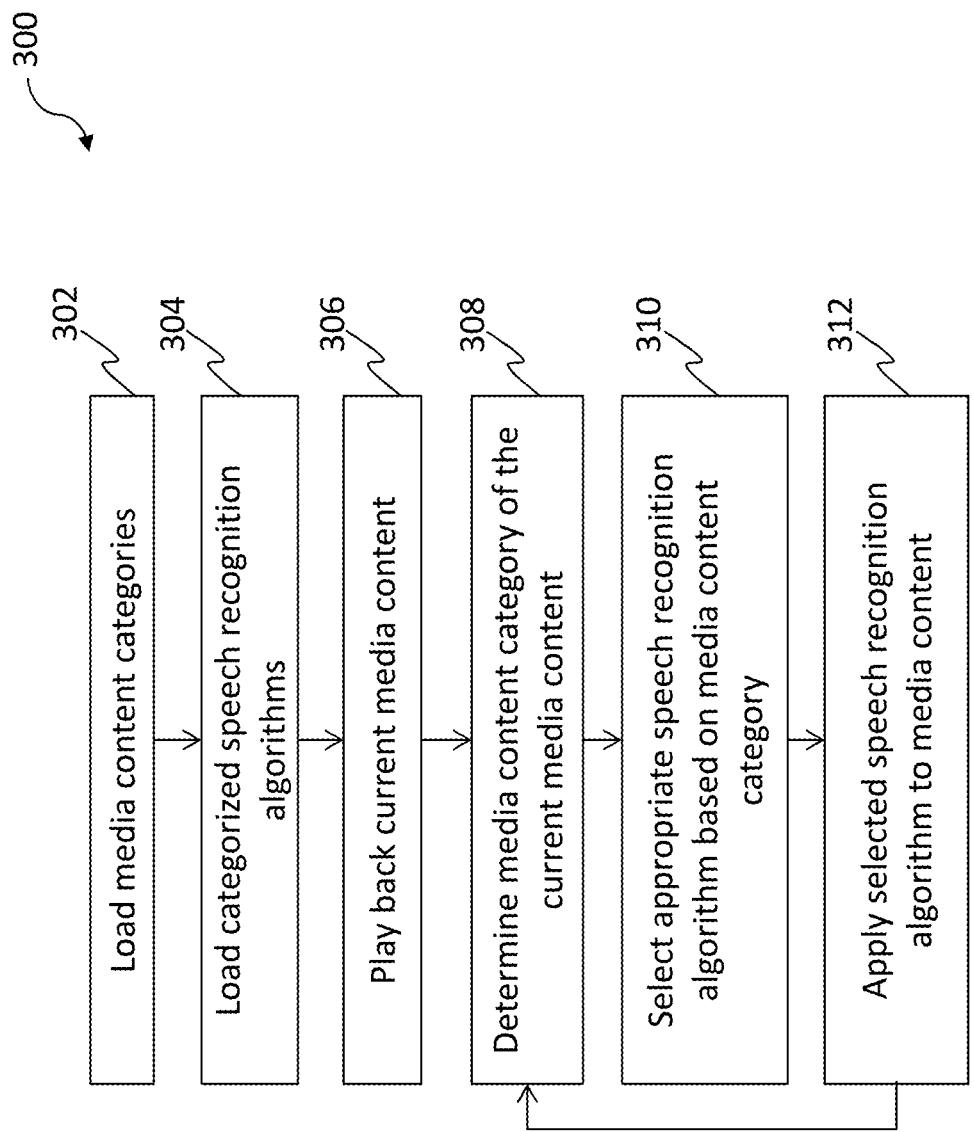
FIG. 3 is an illustrative flow process in accordance with an embodiment of the present disclosure for automatically selecting and applying audio-based display indicia to media content.

Turning to FIG. 3, an example of a flow process 300 in accordance with a non-limiting embodiment of the present disclosure is shown. The flow process 300 may be performed by one or more components of a system, such as system 210 of FIG. 2, which works on or within a media playback device, such as a television or computer, a broadcast system, a media content production system, etc. The flow process 300 may be continuously run or performed when a user is watching playback of media content or may be performed at some point prior to a viewer observing the media content (e.g., during finishing and/or post-production of media content). For example, the flow process 300 may be performed by a broadcast system that is broadcasting media content and the broadcaster desires to include audio-based display indicia with the broadcast media content.

A system that is configured to playback, broadcast, perform post-production, etc. media content may load one or more media content categories, as shown at block 302. The media content categories may be pre-defined or learned by the system, e.g., as described above. The media content categories may include data, information, and/or characteristics including, but not limited to, metadata (e.g., genre, country, year, black and white images, etc.), sound (e.g., Fourier Graphs, variance of frequencies, etc.), image (e.g., histograms), drawings (e.g., cartoon) and reality, characteristics of characters of the media content (e.g., age, gender, etc.), etc.

The system may also load categorized speech recognition algorithms (including speech recognition engines), as shown at block 304. The speech recognition algorithms may be predefined with each speech recognition algorithm being associated with one or more media content categories, which may be assigned by a learning or training process or algorithm as described above. In some embodiments, a learning process may be used such that the system learns appropriate speech recognition algorithm associations and media content categories. In a learned system, the system may store the learned information as it is learned. For example, in one non-limiting embodiment, after the media content categories are set, a learning or training algorithm may be applied to generate and/or define a speech recognition algorithm for each media content category.

At block 306, the system may play back a current media content. As used herein, the current media content is media content to which it is desired to generate and provide audio-based display indicia. For example, in one non-limiting example, a broadcast station may provide live news coverage and/or broadcast media content that should include subtitles and/or captioning. In another non-limiting example, a movie studio may wish to finalize a movie by having audio-based display indicia information embedded into the media content (e.g., digital media content). In another non-limiting example, a user may want to apply audio-based subtitling to a homemade or other media content (e.g., online video, etc.).

At block 308, the system is configured to determine a media content category of the current media content. This determination may be applied to an instantaneous broadcast of live media content, may be applied in a generic sense to an entire media content, or may be applied to a particular portion of a media content (e.g., sections of a movie, commercials versus a show or news, etc.). The determination may be performed by analyzing one or more characteristics of the current media content. For example, the system may analyze metadata (e.g., genre, country, year, black and white images, etc.), sound (e.g., Fourier Graphs, variance of frequencies, etc.), image (e.g., histograms), drawings (e.g., cartoon) and reality, characteristics of characters of the media content (e.g., age, gender, etc.), and/or other characteristics, criteria, parameters, etc. of the media content. The system will thus categorize the current media content.

Based on the determined category of the current media content, the system may select an appropriate speech recognition algorithm, as shown at block 310. That is, using the determined category of the current media content, the system will select a speech recognition algorithm that matches or most closely matches the determined category of the current media content.

At block 312, the system is configured to apply the selected speech recognition algorithm to the current media content. That is, the system automatically uses a speech recognition algorithm that is most appropriate and/or suited to the particular category of the media content. In some embodiments, the application of the speech recognition algorithm may include providing audio-based display indicia in a data stream of a broadcast. In other embodiments, the application may include generating a data file that include the audio-based display indicia, such as when preparing a final cut or production of a movie, television show, or other media content (e.g., prepared in post-production).

The process of determining the media content category of the current media may be performed continuously during a broadcast or other playback (e.g., blocks 308-312 may be continuously repeated during the playback of block 306). As such, the system may be configured to change the selected and applied speech recognition algorithm when the category of the media content changes. For example, in an action movie, there may be periods or portions of the movie that require a first speech recognition algorithm that is configured to best work during action scenes. However, when the movie transitions to a comedic part or a more serious drama part of the same movie, a second speech recognition algorithm may be more suited to this situation. This process may be carried out in real-time such that the best speech recognition algorithm is applied to the current media content at all times.

One optional feature may be to save all data generated for the media content. This may be used for future playback such that the process 300 may not need to be repeated for the same media content more than once. For example, in the example of post-production application of process 300, the saved data may be configured to be provided as a subtitle feature that is supplied with a movie, DVD, digital copy of the media content, etc.

In another embodiment, a feature of the process may be to identify whether the media content has been configured with audio-based display indicia in the past, e.g., subtitling was performed by a human operator. In such a configuration, the system and/or process may include retrieving the audio-based display indicia that was previously generated. The system may then compare the auto-generated audio-based display indicia from process 300 with the prior generated audio-based display indicia. This may be used for system learning. In other embodiments, the prior generated audio-based display indicia may be just one factor considered by the system when process 300 is performed, and the prior generated audio-based display indicia may be part of the information considered in, for example, block 308.

Technical effects and benefits include a system configured to automatically select and apply an appropriate speech recognition algorithm to media content. Such process may be applied in a real-time and/or live basis such that the selected and applied speech recognition algorithm may be changed based on changes in category of media content during playback.

Further, technical effects and benefits include a system configured to dynamically learn and generate new categories and/or associated speech recognition algorithms for specific categories.

Further, advantageously, embodiments here may be applied to various types of media content and playback thereof. For example, in addition to television and movies, embodiments herein may be applied to training videos and materials, online education, streaming conference presentations, video conferencing, etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method to automatically generate audio-based display indicia of media content, the method comprising:
   defining, by a processor, a plurality of media content categories for media content by at least applying a non-supervised clustering algorithm based at least in part on a set of features extracted from the media content, the set of features comprising metadata features that are extracted from one or more video descriptions of the media content, image features extracted from one or more images of the media content, drawing and reality features extracted from one or more images of the media content, and recognized characteristics of characters of the media content;
   receiving, by the processor, a plurality of categorized speech recognition algorithms, each speech recognition algorithm being associated with a respective one or more of the plurality of media content categories;
   determining a media content category of a current media content from the plurality of media content categories based at least in part on a set of current features extracted from one or more video descriptions of the current media content, image features extracted from the current media content, drawings and reality features extracted from the current media content, and recognized characteristics of characters of the current media content;
   selecting one speech recognition algorithm from the plurality of categorized speech recognition algorithms based on the determination of the media content category of the current media content; and
   applying the selected speech recognition algorithm to the current media content.

2. The computer implemented method of claim 1, wherein the audio-based display indicia is at least one of subtitles or captions related to the media content.

3. The computer implemented method of claim 1, further comprising, playing back the current media content, wherein the determination, selection, and application of the speech recognition algorithm is done during playback.

4. The computer implemented method of claim 3, further comprising continuously performing the determination, selection, and application of the speech recognition algorithm during playback.

5. The computer implemented method of claim 1, further comprising saving the selected speech recognition algorithm and associating the saved selected speech recognition algorithm with the current media content.

6. The computer implemented method of claim 1, further comprising receiving prior audio-based display indicia associated with the current media content.

7. The computer implemented method of claim 6, further comprising comparing an output of application of the speech recognition algorithm to the current media content with the prior audio-based display indicia associated with the current media content.

8. A system to automatically generate audio-based display indicia of media content comprising:
   a memory having computer readable instructions; and
   a processor configured to execute the computer readable instructions, the computer readable instructions comprising:

defining, by the processor, a plurality of media content categories for media content by at least applying a non-supervised clustering algorithm based at least in part on a set of features extracted from the media content, the set of features comprising metadata features that are extracted from one or more video descriptions of the media content, image features extracted from one or more images of the media content, drawing and reality features extracted from one or more images of the media content, and recognized characteristics of characters of the media content;

receiving, by the processor, a plurality of categorized speech recognition algorithms, each speech recognition algorithm being associated with a respective one or more of the plurality of media content categories;

determining, by the processor, a media content category of a current media content from the plurality of media content categories based at least in part on a set of current features extracted from the current media content, the set of current features comprising metadata features extracted from one or more video descriptions of the current media content, image features extracted from the current media content, drawing and reality features extracted from the current media content, and recognized characteristics of characters of the current media content;

selecting, by the processor, one speech recognition algorithm from the plurality of categorized speech recognition algorithms based on the determination of the media content category of the current media content; and applying, by the processor the selected speech recognition algorithm to the current media content.

9. The system of claim 8, wherein the audio-based display indicia is at least one of subtitles or captions related to the media content.

10. The system of claim 8, further comprising, playing back the current media content, wherein the determination, selection, and application of the speech recognition algorithm is done during playback.

11. The system of claim 10, further comprising continuously performing the determination, selection, and application of the speech recognition algorithm during playback.

12. The system of claim 8, further comprising saving the selected speech recognition algorithm and associating the saved selected speech recognition algorithm with the current media content.

13. The system of claim 8, further comprising receiving prior audio-based display indicia associated with the current media content.

14. The system of claim 13, further comprising comparing an output of application of the speech recognition algorithm to the current media content with the prior audio-based display indicia associated with the current media content.

15. A computer program product to automatically generate audio-based display indicia of media content, the computer program product comprising a computer readable storage medium having program instructions embodied therewith, wherein the computer readable storage medium is not a transitory signal per se, the program instructions executable by a processor to cause the processor to:

define, by the processor, a plurality of media content categories for media content by at least applying a non-supervised clustering algorithm based at least in part on a set of features extracted from the media content, the set of features comprising metadata features that are extracted from one or more video descriptions of the media content, image features extracted from one or more images of the media content, drawing and reality features extracted from one or more images of the media content, and recognized characteristics of characters of the media content;

receive, by the processor, a plurality of categorized speech recognition algorithms, each speech recognition algorithm being associated with a respective one or more of the plurality of media content categories;

determine, by the processor, a media content category of a current media content from the plurality of media content categories based at least in part on a set of current features extracted from the current media content, the set of current features comprising metadata features extracted from one or more video descriptions of the current media content, image features extracted from the current media content, drawing and reality features extracted from the current media content, and recognized characteristics of characters of the current media content;

select, by the processor, one speech recognition algorithm from the plurality of categorized speech recognition algorithms based on the determination of the media content category of the current media content; and apply, by the processor, the selected speech recognition algorithm to the current media content.

16. The computer program product of claim 15, wherein the audio-based display indicia is at least one of subtitles or captions related to the media content.

17. The computer program product of claim 15, the program instructions executable by a processor further configured to cause the processor to: continuously perform the determination, selection, and application of the speech recognition algorithm during playback.

18. The computer program product of claim 15, the program instructions executable by a processor further configured to cause the processor to: save the selected speech recognition algorithm and associating the saved selected speech recognition algorithm with the current media content.

19. The computer program product of claim 15, the program instructions executable by a processor further configured to cause the processor to: receive prior audio-based display indicia associated with the current media content.

20. The computer program product of claim 19, the program instructions executable by a processor further configured to cause the processor to: compare an output of application of the speech recognition algorithm to the current media content with the prior audio-based display indicia associated with the current media content.

* * * * *